US008553944B2

(12) United States Patent
Wu et al.

(10) Patent No.: US 8,553,944 B2
(45) Date of Patent: Oct. 8, 2013

(54) REMOVING LEAKAGE FROM A DOUBLE-SIDED DOCUMENT

(75) Inventors: Chenyu Wu, Mountain View, CA (US); Jing Xiao, Cupertino, CA (US)

(73) Assignee: Seiko Epson Corporation, Tokyo (JP)

( * ) Notice: Subject to any disclaimer, the term of this patent is extended or adjusted under 35 U.S.C. 154(b) by 701 days.

(21) Appl. No.: 12/814,903

(22) Filed: Jun. 14, 2010

(65) Prior Publication Data
US 2011/0304888 A1    Dec. 15, 2011

(51) Int. Cl.
*G06K 9/00*    (2006.01)

(52) U.S. Cl.
USPC .......................................................... 382/112

(58) Field of Classification Search
USPC .................................. 382/112, 151, 294, 309
See application file for complete search history.

(56) References Cited

U.S. PATENT DOCUMENTS

| | | | |
|---|---|---|---|
| 5,646,744 A | 7/1997 | Knox | |
| 5,832,137 A | 11/1998 | Knox | |
| 6,101,283 A | 8/2000 | Knox | |
| 6,288,798 B1 | 9/2001 | Sharma | |
| 6,862,117 B1 | 3/2005 | Ford et al. | |
| 7,145,697 B1 | 12/2006 | Sharma et al. | |
| 7,209,599 B2 * | 4/2007 | Simske et al. | 382/275 |
| 7,620,360 B2 * | 11/2009 | Heydinger et al. | 399/374 |
| 7,773,273 B2 * | 8/2010 | Jeong | 358/474 |
| 7,965,421 B2 * | 6/2011 | Fan et al. | 358/3.26 |

OTHER PUBLICATIONS

Almeida, M., et al., "Wavelet-based separation of nonlinear show-through and bleed-through image mixtures". Neurocomputing 72, 2008, pp. 57-70.
Sharma, G., "Show-Through Cancellation in Scans of Duplex Printed Documents", IEEE Transactions on Image Processing, vol. 10, No. 5, May 2001.
Merrikh-Bayat, F., et al., "A Nonlinear Blind Source Separation Solution for Removing the Show-Through Effect in the Scanned Documents", 16th European Signal Processing Conference, Switzerland, 2008.
Salerno, E., et al., "Digital Image Analysis to Enhance Underwritten Text in the Archimedes Palimpsest", International Journal on Document Analysis and Recognition, vol. 9, pp. 79-87, Apr. 2007.
Sharma, G., "Cancellation of Show-Through in Duplex Scanning". Proceedings IEEE International Conference on Image Processing, vol. 11, pp. 609-612, Sep. 2000.
Tonazzini, A., et al., "Fast Correction of Bleed-Through Distortion in Grayscale Documents by a Blind Source Separation Technique", International Journal of Document Analysis, pp. 17-25, 2007.
Dubois, Eric., et al., "Reduction of Bleed-Through in Scanned Manuscript Documents", IS and TS Pics Conference, 2001 University of Ottawa, Canada.

* cited by examiner

*Primary Examiner* — Daniel Mariam (57) ABSTRACT

Aspects of the present invention include systems and methods for mitigating the effects of leakage when duplicating an image from a double-sided document. In embodiments, a device is calibrated by computing a leakage function. The leakage function is used to obtain a leakage mitigation function. Given the leakage function and the leakage mitigation function, an estimate of a true version of the document image can be obtained using as inputs only the images of the front-side and back-side of the double-sided document.

20 Claims, 13 Drawing Sheets

100

Obtain an image of the front side of a document that has a calibration pattern on the back side — 105

↓

Rectify the image — 110

↓

Given the rectified image, generate a set of data comprising the intensity of each calibration block within the calibration pattern — 115

↓

Estimate a leakage function, $g(.)$, by fitting a function to the set of data compared to the actual intensities of the calibration patches — 120

↓

Using the leakage function, obtain an inverse function, $f^{-1}(.)$, that takes as inputs front-side and back-side scanned images and outputs an estimate of a true image of the front-side and/or the back-side — 125

FIGURE 1

(recto or
front side)

205

(verso or
back side)

210

"X"
$X = A + g(B_{flip})$ (recto or
front side)

215

"Y"
$Y = B + g(A_{flip})$ (verso or
back side)

305 Calibration Pattern

310 Scanned Image (Calibration Pattern on Backside)

315 Rectified Scanned Image

```
Receive input image X (recto) corresponding to true image A and     ─ 805
input image Y (verso) corresponding to true image B
```

```
Given a leakage calibration function, g(.) and the leakage
mitigation function f⁻¹(.), compute an estimate of the true image A    ─ 810
according to the formula:
A = f⁻¹[X - g(Y_flip)]
```

```
If desired, compute an estimate of the true image B according to
the formula:                                                        ─ 815
B = f⁻¹[ Y - g(X_flip)]
```

REMOVING LEAKAGE FROM A DOUBLE-SIDED DOCUMENT

BACKGROUND

A. Technical Field

The present invention pertains generally to document image processing; and relates more particularly to systems and methods for compensating for leakage related to double-sided document imaging.

B. Background

A common element of contemporary society is the handling of documents in physical and electronic forms. At times, it is more convenient or beneficial to work with documents in a physical form. And, at other times, such as for archiving, copying, transmitting, and the like, it is more convenient to have a physical document converted into an electronic image.

A physical document is printed on a substrate, typically paper. Because the document substrate has some degree of translucence or partial transparency, some of the image on the reverse side (verso) of the document is captured when imaging the front side (recto) of the document. The substrate translucence is particularly prevalent when the imaging of the document is performed using a scanner. When scanning, a bright light is used to illuminate the document, which tends to increase the translucence of the document. Thus, an image of the document generated by scanning results in the image containing information from both the recto and verso sides of the document. The appearance of portions of one side of the document being seen on the other side of the document is called "show-through" image information.

Another cause of the back-side image being partially visible on the front-side image is a result of ink seeping into, or even through, the paper. This phenomenon is typically referred to as "bleed-through." However, improvements in printing and publishing have made the issue of bleed-through far less prevalent and is typically associated with old documents. Both "show-through" and "bleed-through" shall be treated as "leakage," meaning that at least a portion of a back-side image affects the front-side image when duplicating the front-side image.

Various attempts have been used to mitigate leakage effects when imaging a document. For example, the show-through problem can be reduced by placing a black backing behind the document being imaged. That way, light that passes through the document substrate is absorbed by the backing and is not reflected back to the imaging sensors. Such a method, however, has limitations. First, some of the light reflects off the back-side image and affects the imaging of the front-side. Second, some duplex scanning devices, particularly those used for high volume scanning, scan both images at the same time, making it impossible to have a black backing. Finally, the black backing itself can create a show-through effect in the resultant image.

Accordingly, what is needed are systems and methods that can mitigate the effects of leakage of a back-side image of a document into an image taken of the front-side of the document.

SUMMARY OF THE INVENTION

Presented herein are systems and methods for mitigating the effects of leakage when duplicating an image from a double-sided document. The leakage may be a result of show-through and/or bleed-through from images on the reverse side. In embodiments, a device is calibrated by computing a leakage function. The leakage function is used to obtain a leakage mitigation function. Given the leakage function and the leakage mitigation function, an estimate of a true version of the document image can be obtained using as inputs only the images of the front-side and back-side of the double-sided document. One skilled in the art shall recognize that the same or similar methods may be applied to show-through from another page.

In embodiments, leakage of a document may be reduced by causing the following steps to be performed. First, a first image X captured by a sensor array is obtained, either directly from the sensor array or from storage. The first image X is an image of a first side A of a double-sided document. Similarly, a second image Y captured by a sensor array is also obtained. The second image Y being an image of a second side B of the double-sided document. The leakage of the second side B onto the first side A is estimated. Given a leakage estimate, a leakage mitigation function is applied to the first image X minus the estimated leakage of the second side B onto the first side A to obtain an estimate image of the first side A.

In embodiments, a leakage function is obtained by getting, either directly from a sensory array or from memory storage, a calibration image C captured by the sensor array. This image C is an image of a first side of a document having a calibration pattern on a second side of the document. The calibration pattern has a known configuration comprising a plurality of areas of different intensities. The image C is examined to generate a set of data comprising intensities for each area of at least some of the areas in the image C that correspond to areas of the plurality of areas of the calibration pattern. Given this set of data that correlates front-sided leakage intensities to back-side image intensities, a leakage function can be estimated by fitting a function to the set of data.

In embodiments, a leakage mitigation function, which takes as inputs a first image of a first side of a double-sided document and a second image of a second side of the double-sided document and outputs a leakage-reduced image of the first side, can be obtained by obtaining a function comprising the first side minus values of the leakage function operation upon an output range of the leakage function operating on the first side, and by obtaining an inverse of the function, wherein the inverse is the leakage mitigation function. In embodiments, the leakage mitigation function is given by the inverse of:

$f(A)=A-g[g(A)]+b_1-\delta$, where $g(\ )$ represents the leakage function, A represents the first side, and $\delta$ represents an error value function. In embodiments, $\delta$ is set as a constant, which constant may be zero.

The methods presented herein may be contained in a computer program product comprising at least one computer-readable medium storing one or more sequences of instructions, wherein execution of the one or more sequences of instructions by one or more processors causes the one or more processors to execute a computer-implemented method or methods. Embodiments of the present invention include a computer system or systems for reducing leakage by performing one or more of the methods disclosed herein.

Some features and advantages of the invention have been generally described in this summary section; however, additional features, advantages, and embodiments are presented herein or will be apparent to one of ordinary skill in the art in view of the drawings, specification, and claims hereof. Accordingly, it should be understood that the scope of the invention shall not be limited by the particular embodiments disclosed in this summary section.

BRIEF DESCRIPTION OF THE DRAWINGS

Reference will be made to embodiments of the invention, examples of which may be illustrated in the accompanying figures. These figures are intended to be illustrative, not limiting. Although the invention is generally described in the context of these embodiments, it should be understood that it is not intended to limit the scope of the invention to these particular embodiments.

DETAILED DESCRIPTION OF THE PREFERRED EMBODIMENTS

In the following description, for purpose of explanation, specific details are set forth in order to provide an understanding of the invention. It will be apparent, however, to one skilled in the art that the invention may be practiced without these details. One skilled in the art will recognize that embodiments of the present invention, some of which are described below, may be incorporated into a number of different systems and devices, including by way of illustration and not limitation, cameras (video and/or still image), printers, scanners, copiers, computer systems, multi-function devices, and the like. Aspects of the present invention may be implemented in software, hardware, firmware, or combinations thereof.

Components, or modules, shown in block diagrams are illustrative of exemplary embodiments of the invention and are meant to avoid obscuring the invention. It shall also be understood that throughout this discussion that components may be described as separate functional units, which may comprise sub-units, but those skilled in the art will recognize that the various components, or portions thereof, may be divided into separate components or may be integrated together, including integrated within a single system or component.

Furthermore, connections between components/modules within the figures are not intended to be limited to direct connections. Rather, data between these components may be modified, re-formatted, or otherwise changed by intermediary components. Also, additional or fewer connections may be used. It shall also be noted that the terms "coupled" or "communicatively coupled" shall be understood to include direct connections, indirect connections through one or more intermediary devices, and wireless connections.

Reference in the specification to "one embodiment," "an embodiment," or "embodiments," means that a particular feature, structure, characteristic, or function described in connection with the embodiment or embodiments is included in at least one embodiment of the invention and may be in more than one embodiment. The appearances of the phrase "in one embodiment," or "in an embodiment," or "in embodiments," in various places in the specification are not necessarily all referring to the same embodiment or embodiments.

A. Methods for Obtaining the Leakage Mitigation Function

Figure 1:
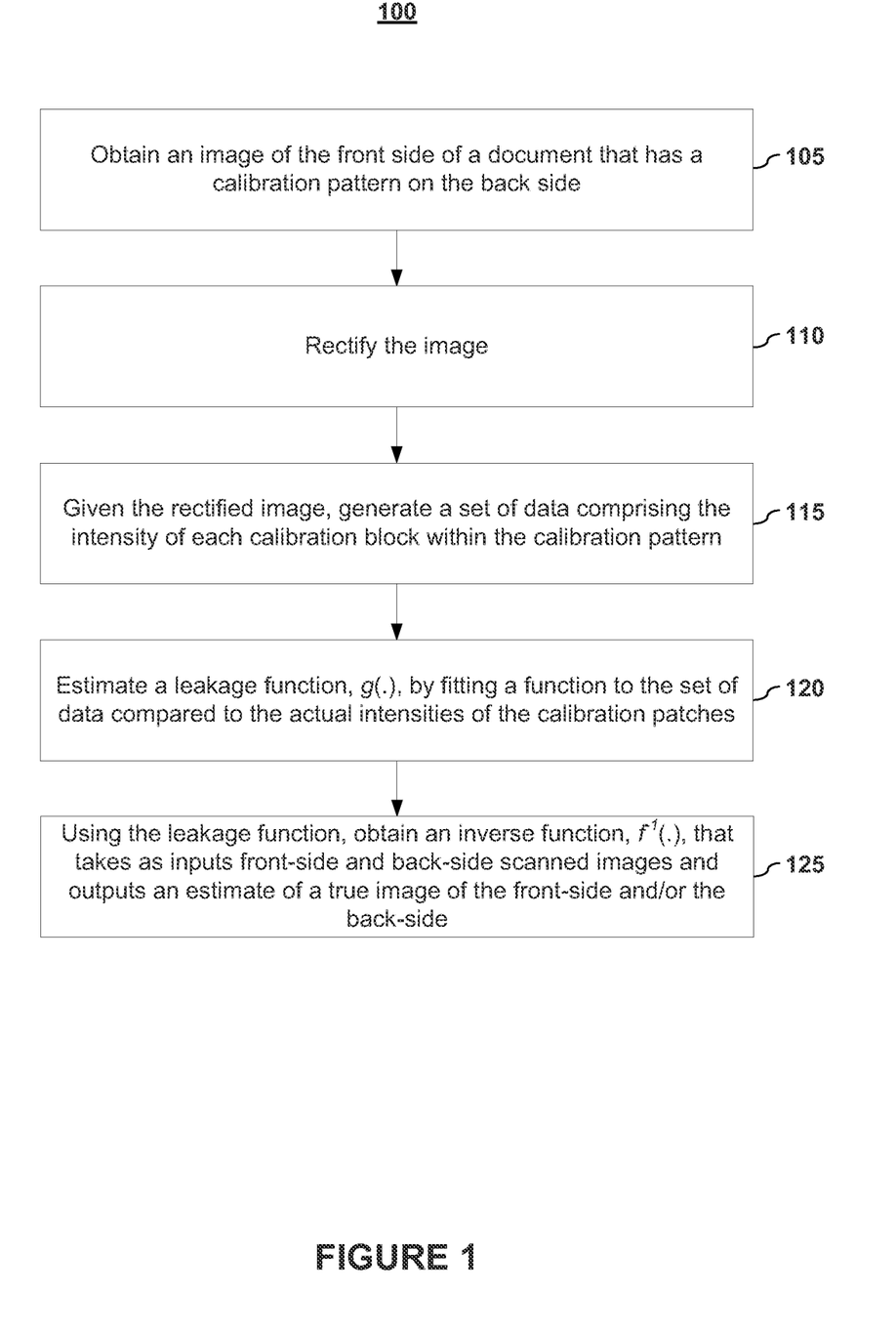
FIG. 1 depicts a method for obtaining a leakage mitigation function for reducing the effects of double-sided image leakage according to various embodiments of the invention.

FIG. 1 depicts a method 100 for obtaining a leakage mitigation function for reducing the effects of double-sided image leakage according to various embodiments of the invention. Before providing a detailed explanation of the method 100 depicted in FIG. 1, it is beneficial to examine the relationship that creates the leakage problem.

Figure 2:
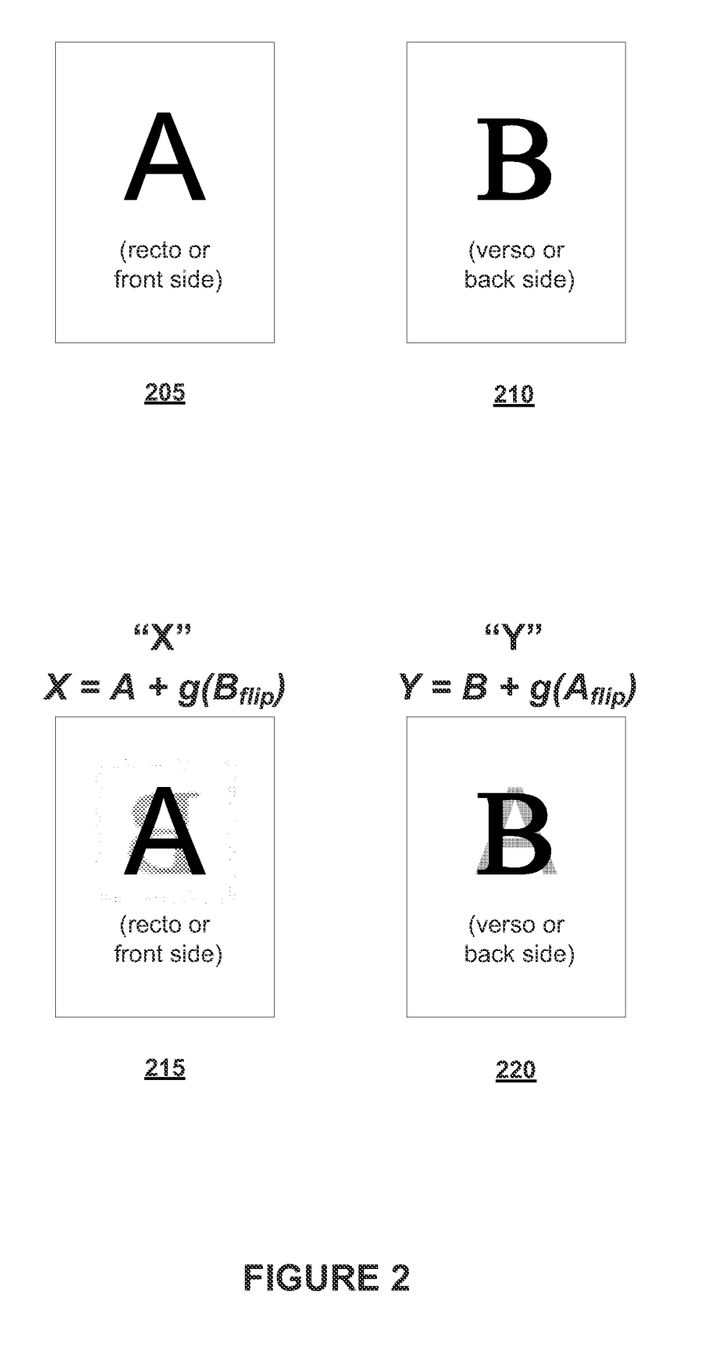
FIG. 2 depicts both sides (A and B) of a double-sided document and the resulting images (X and Y, respectively) of the sides with some leakage being visible in the images.

FIG. 2 depicts both sides, side A 205 and side B 210, of a double-sided document. Due to leakage, the resulting images, image X 215 and image Y 220, of side A and side B (respectively) contain some visible portion of the image on the reverse side. That is, each image is formed from the image on the facing side of the document plus some show-though portion from the reverse side. The amount that the reverse side shows through to the facing side during imaging is considered to be predictive based upon a leakage function, g(.). Accordingly, the resulting images, image X 215 and image Y 220, can be expressed mathematically as follows:

$$X = A + g(B_{flip}) \qquad \text{Eq. (1)}$$

$$Y = B + g(A_{flip}) \qquad \text{Eq. (2)}$$

Thus, part of the method depicted in FIG. 1 involves estimating this leakage function, g(.). Note that the images are flipped because when side A is forward facing, side B is in a flipped or mirrored configuration, and likewise when side B is forward facing, side A is in a flipped or mirrored configuration.

Figure 3:
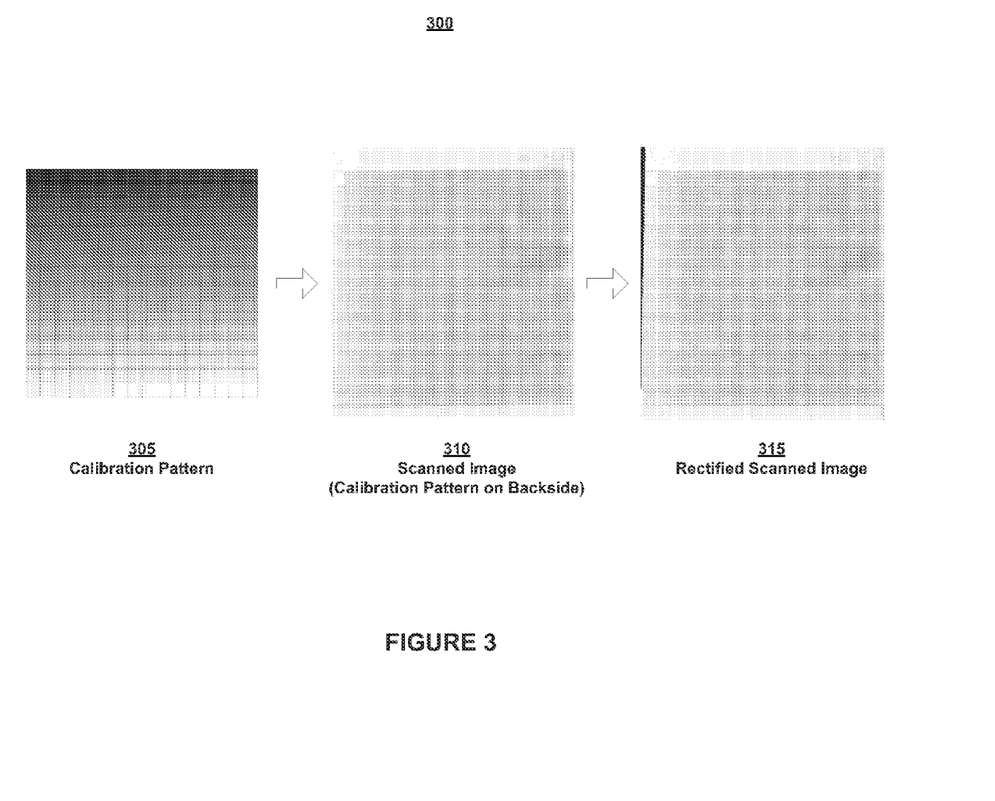
FIG. 3 illustrates various images of a calibration pattern used to obtain a leakage function according to various embodiments of the invention.

In the depicted embodiment, a calibration pattern is used to obtain a leakage function for a device. An example of a calibration pattern 305 is depicted in FIG. 3. In embodiments, a calibration pattern comprises a set of 256 areas (16×16 blocks), wherein each area has a different intensity. Thus, the calibration pattern 305 covers the range of intensities from 0 to 255. It shall be noted that other calibration patterns may be used and that no particular calibration pattern is critical to the present invention.

The calibration pattern is printed on the back side of the document and the front side of the document is imaged 105. FIG. 3 depicts an example of a scanned image 310, wherein the front side of the document has been scanned and the back side of the document contains the calibration pattern 305. It shall be noted that, even though the calibration pattern 305 is on the back side of the document, the pattern can be seen, at least partially, in the scanned image 310 due to leakage caused by the partial transparency of the document.

In embodiments, if necessary, the scanned image 310 is rectified 110. By rectifying the scanned image, the calibration pattern is aligned within rectangular coordinates making it easier to identify the locations of blocks within the calibration pattern. Thus, the intensities for areas in the front side image can be correlated to intensities of areas in the calibration pattern. In embodiments, the image can be rectified by detecting one or more of the edges of the calibration pattern and determining an amount of rotation needed to adjust the image to cause the calibration pattern to be rectified. It shall be noted that rectification is well known to those skilled in that art and that no particular rectification method is critical to the present invention.

Given the rectified image, a set of intensity values comprising the intensity of for at least some areas in the front-side image within the calibration pattern can be determined 115. Because the calibration pattern is known and given the rectified image, the location of each block in the calibration pattern can be identified within the scanned image. The intensity value of pixels from areas in the front-side image can be correlated to the intensity of corresponding calibration block. In embodiments, the front-side image areas are the same size as the corresponding calibration blocks; although one skilled in the art shall recognize that this need not be the case. In embodiments, the intensity of the pixels of a front-side image area are averaged to obtain an average value to correspond to the intensity value for the corresponding calibration block.

In embodiments, since the front side is white and the calibration image ranges in intensity from 0 to 255, the image of the front side, X, can be represented according to Eq. (1) as follows:

$$X=255+g([0:255])\qquad\text{Eq. (3)}$$

where X is the imaged front side and g(.) represents a leakage function of how much of the back-side image is visible through and forms a part of image X. Thus, the equation can be written as follows:

$$g([0:255])=X-255\qquad\text{Eq. (4)}$$

Figure 4:
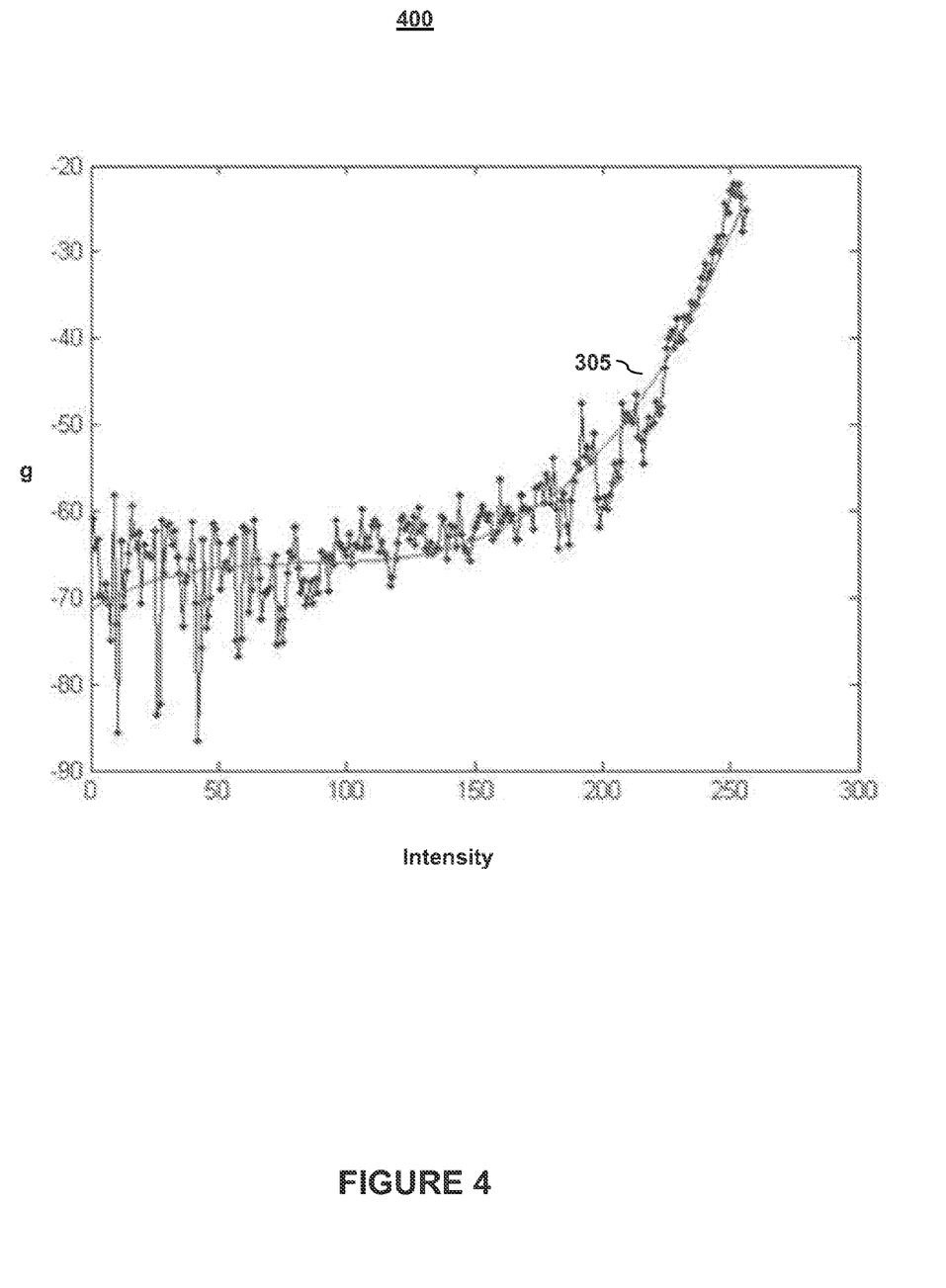
FIG. 4 depicts a graph of data points used to estimate a leakage function according to various embodiments of the invention.

FIG. 4 depicts a graph 400 of data points used to estimate a leakage function according to various embodiments of the invention. For each point, the horizontal value represents the intensity from the calibration blocks (0 to 255), and the corresponding vertical value represents the leakage, g, which is the average intensity of the calibration blocks as they appear on the image of the front side, X. The set of data can be used to fit a function to estimate g(.). In embodiments, a cubic function of the following format is used to fit g(.):

$$g(x)=b_1+b_2x+b_3x^2+b_4x^3\qquad\text{Eq. (5)}$$

Figure 5:
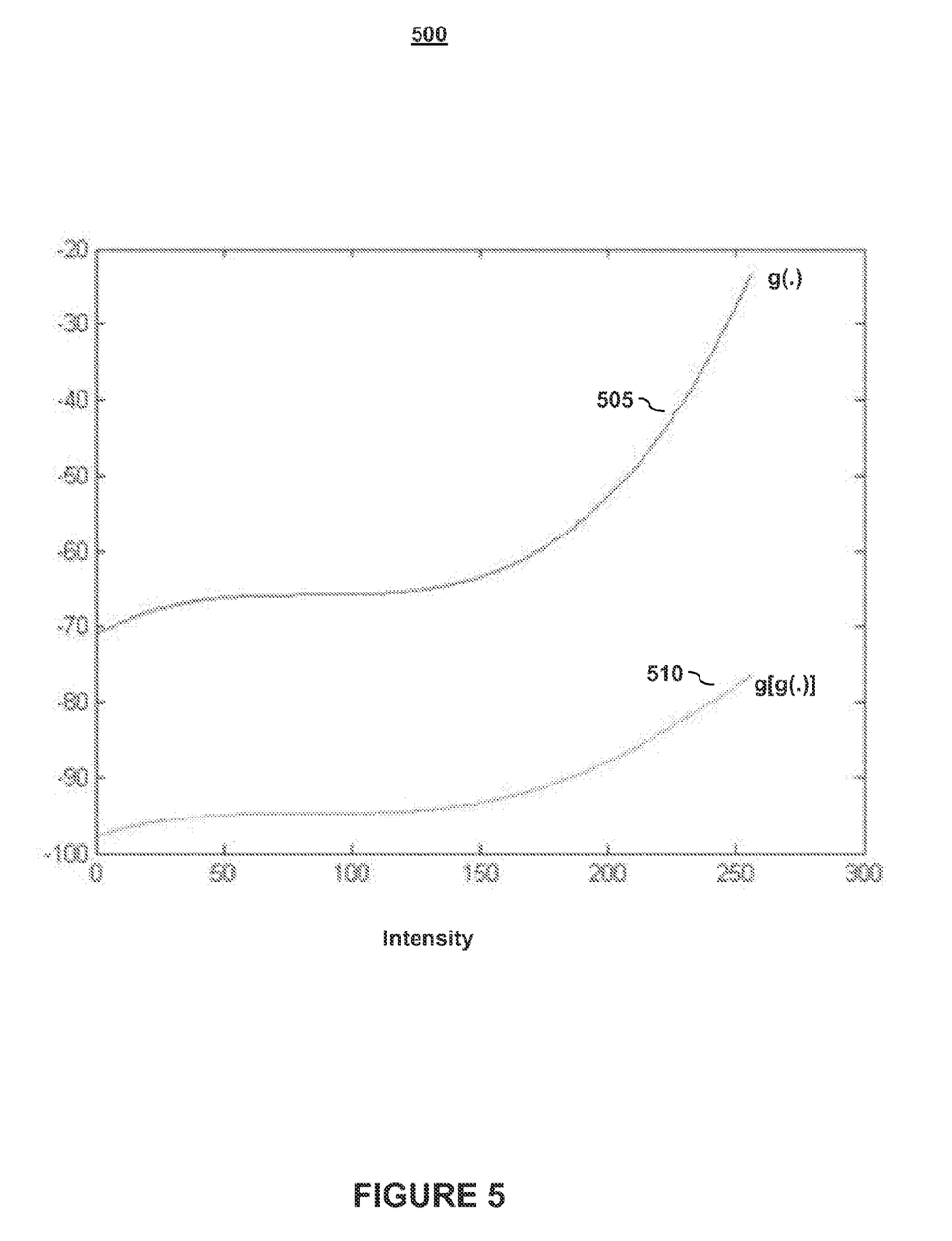
FIG. 5 depicts a graph of a leakage function, g(.), and a graph of the leakage function operating upon itself, g[g(.)], according to various embodiments of the invention.

From the example data set depicted in FIG. 4, the coefficients for the cubic fitting are: $b_1=-71.039$, $b_2=0.18219$, $b_3=-0.0021386$, and $b_4=8.412e-6$. The fitted function, g(x), is depicted as a line 305 in FIG. 4. FIG. 5 depicts a graph 505 of a leakage function, g(x), of FIG. 4 without the data points present. Also depicted in FIG. 5 is a graph of the leakage function operating upon itself, g[g(x)]510, according to various embodiments of the invention. The second function, g[g(x)]510, will be used below to help obtain a leakage mitigation function, $f^{-1}(.)$.

Given a leakage function, a leakage mitigation function, $f^{-1}(.)$, can be estimated. Applying the leakage function, g(.), to both sides of Equation (2) yields:

$$g(Y)=g[B+g(A_{flip})]\qquad\text{Eq. (6)}$$

Using the cubic function form of Equation (5), g(Y) can also be written as:

$$g(Y)=b_1+b_2[B+g(A_{flip})]+b_3[B+g(A_{flip})]^2+b_4[B+g(A_{flip})]^3\qquad\text{Eq. (7)}$$

which can be reduced to:

$$g(Y)=g(B)+g[g(A_{flip})]-b_1+Bg(A_{flip})\{2b_3+3b_4[B+g(A_{flip})]\}\qquad\text{Eq. (8)}$$

To simplify the equations, the last term of Equation (8) can be defined as follows:

$$\delta=Bg(A_{flip})\{2b_3+3b_4[B+g(A_{flip})]\},\qquad\text{Eq. (9)}$$

where $B\in[0,255]$ and $A_{flip}\in[0,255]$.

Figure 6:
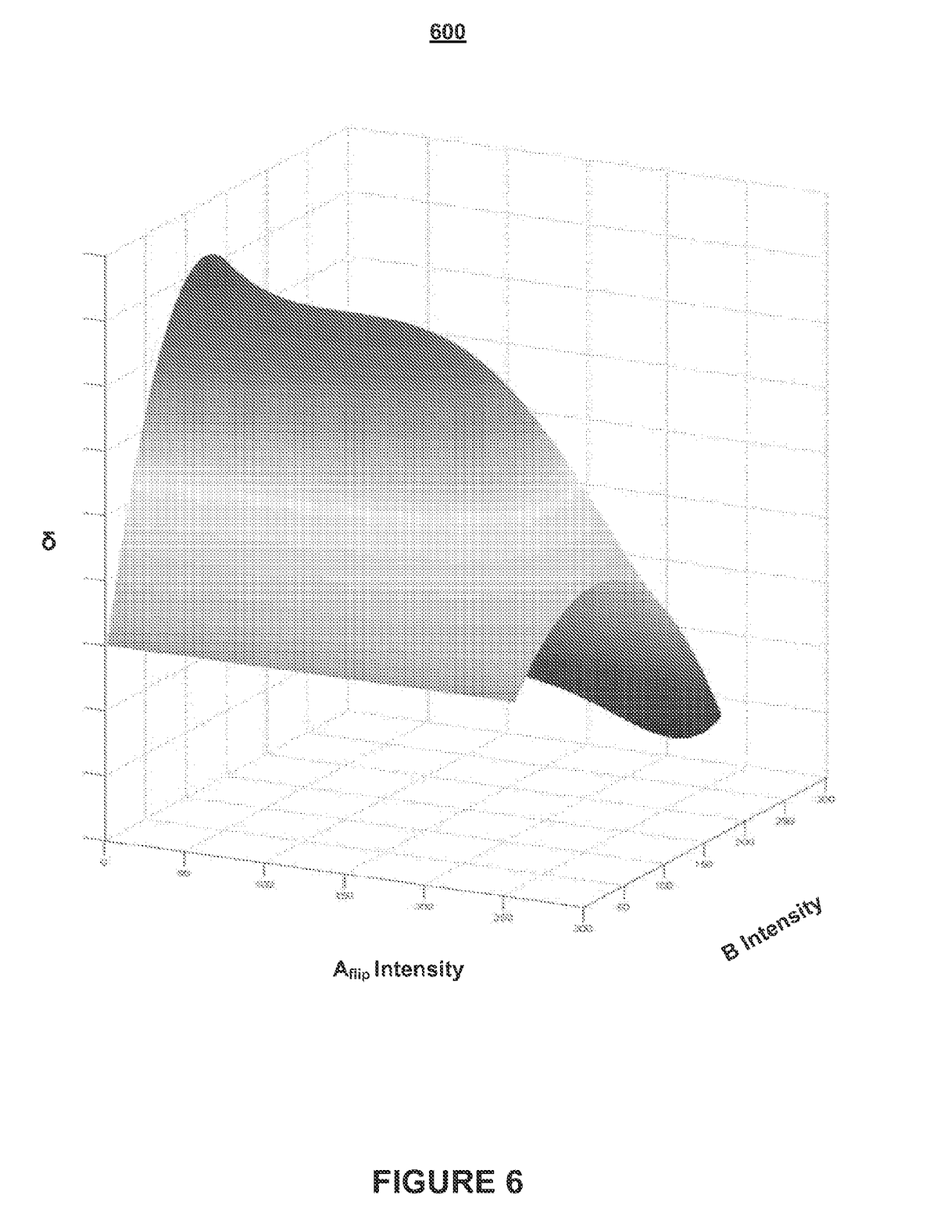
FIG. 6 depicts an error function of the leakage function, δ, as a function of intensity of the recto and verso images of a double-sided document, according to various embodiments of the invention.

FIG. 6 graphically depicts δ as a function of intensity of the $A_{flip}$ and B images according to various embodiments of the invention. In the depicted embodiment, the function had a maximum value of 25.9276 and a minimum value of −11.7706. In embodiments, to simplify the method, the high order terms are ignored and δ is considered as a constant. In embodiments, an appropriate number is assigned to δ given the above range.

With the substitution for δ, Equation (8) can be rewritten as:

$$g(Y)=g(B)+g[g(A_{flip})]-b_1+\delta\qquad\text{Eq. (10)}$$

If the image X were flipped, Equation (1) could be rewritten as follows:

$$X_{flip}=A_{flip}+g(B)\qquad\text{Eq. (11)}$$

Subtracting Equation (10) from Equation (11) to eliminate g(B) yields the following equation:

$$X_{flip}-g(Y)=A_{flip}-g[g(A_{flip})]+b_1-\delta\qquad\text{Eq. (12)}$$

Flipping the images in Equation (12) yields:

$$X-g(Y_{flip})=A-g[g(A)]+b_1-\delta\qquad\text{Eq. (13)}$$

If we define the right side of Equation (13) as follows:

$$f(A)=A-g[g(A)]+b_1-\delta,\qquad\text{Eq. (14)}$$

Using Equation (14), Equation (13) can be rewritten as:

$$X-g(Y_{flip})=f(A)\qquad\text{Eq. (15)}$$

Therefore, the true image of side A can be found as a function of the input scanned images X and Y:

$$A=f^{-1}[X-g(Y_{flip})]\qquad\text{Eq. (16)}$$

Figure 7:
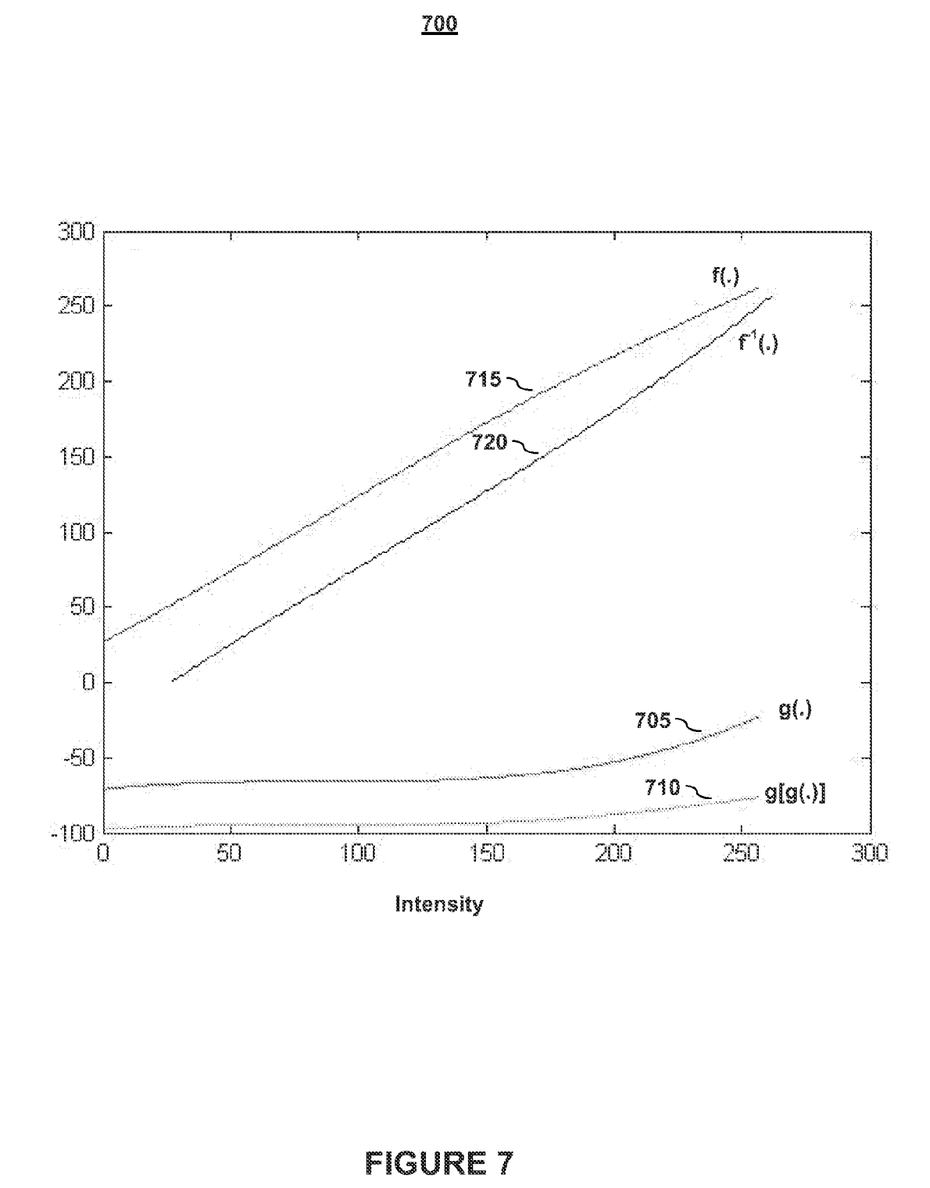
FIG. 7 graphically a graph of a leakage function, g(.), the leakage function operating upon itself, g[g(.)], a graph, $f(.)$, that is a function of the true image A and the leakage function, and an inverse of that function, $f^{-1}(.)$, that is the leakage mitigation function, according to various embodiments of the invention.

Thus, given a leakage function g(.) and g[g(.)], Equation (14) can be used to generate $f(A)$ using A spanning 0 to 255. Given $f(A)$, the leakage mitigation function, $f^{-1}(A)$, can be obtained. In embodiments, the leakage mitigation function, $f^{-1}(A)$, is obtained by fitting a cubic function to the data obtained from $f(A)$ with the x and y values interchanged. In embodiments, the value for δ may be selected from between the maximum and minimum values for δ. In embodiments, the selection was done at random. In embodiments, the value of δ may be set to zero. In embodiments, different values of δ may be tested and the best one may be selected. FIG. 7 graphically a graph of a leakage function, g(.) 705, the leakage function operating upon itself, g[g(.)] 710, a graph, $f(.)$ 715, that is a function of the true image of side A and the leakage function, and an inverse of that function, $f^{-1}(.)$ 720, which is the leakage mitigation function, according to various embodiments of the invention.

B. Methods for Using the Leakage Mitigation Function

Figure 8:
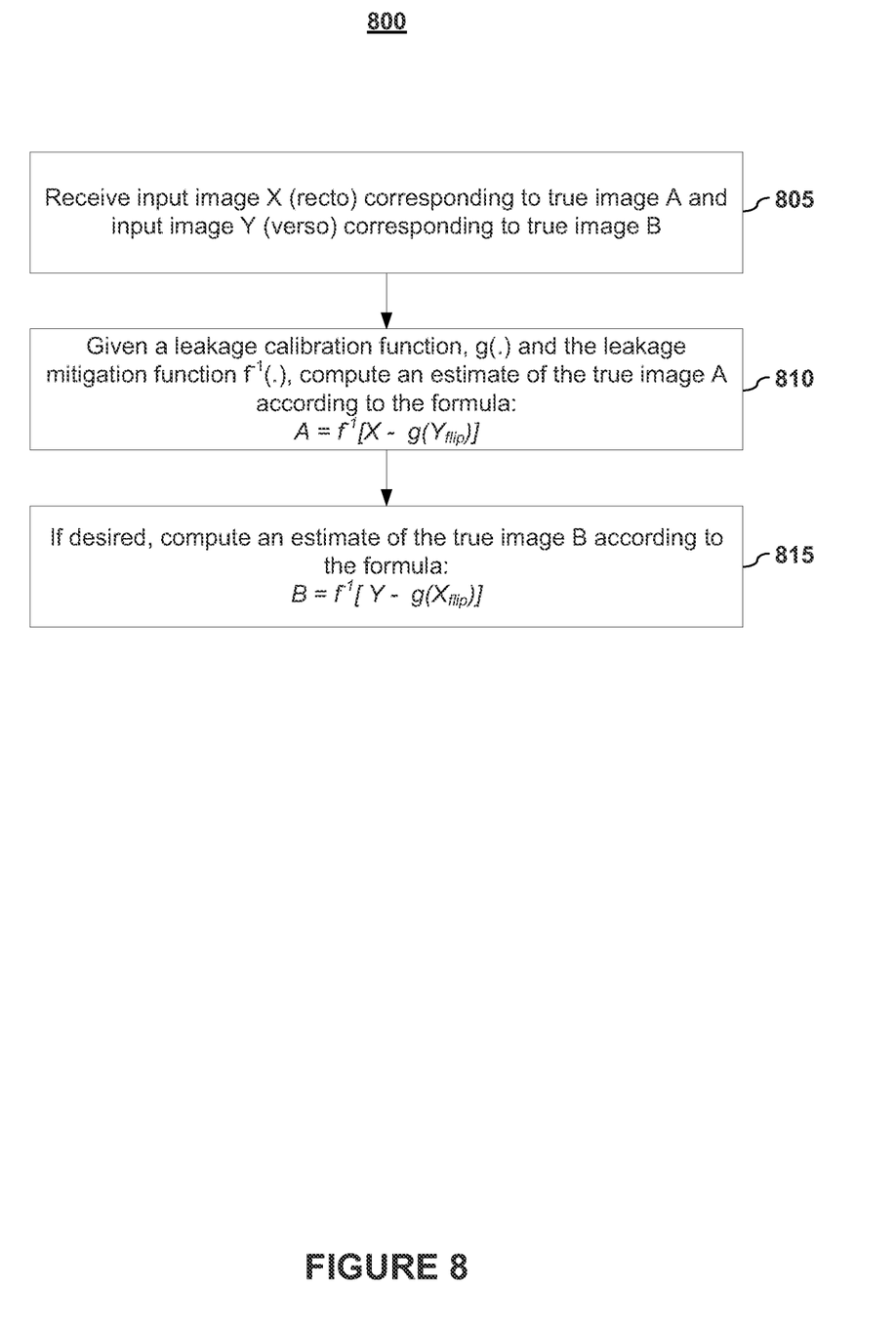
FIG. 8 depicts a method for mitigating the effects of double-sided image leakage when imaging a document according to various embodiments of the invention.

Given a leakage function and a leakage mitigation function, imaged documents that suffer from leakage effects can have at least some of the leakage removed. FIG. 8 depicts a method 800 for mitigating the effects of double-sided image leakage when imaging a document according to various embodiments of the invention.

As illustrated in FIG. 8, the method 800 commences by receiving (805) the two input images from the double-sided document. Using, for purposes of illustration the images in FIG. 2, the input images would be image X 215 corresponding to true image of side A 205 with some leakage from the verso side B 210 and input image Y 220 corresponding to true image of side B 210 with some leakage from side A 205. As noted previously, the images X and Y may be obtained from any sensor capturing devices, such as, by way of example and not limitation, a camera or scanner. In embodiments, the input images, X and Y, are aligned or have a known alignment. In embodiments, the marker lines of the scanner are used to align the papers. In alternative embodiments, some salient points can be selected from the front/back images and these points can be used for the alignment. As is well known in the art, a transformation matrix and a rotation matrix are computed and applied to one of image.

Given a leakage calibration function, g(.), and a leakage mitigation function, $f^{-1}(.)$, which can be obtained as described above, an estimate of the true image of side A can be computed (810) according to Equation (16), which is reproduced below for convenience:

$$A = f^{-1}[X - g(Y_{flip})] \qquad \text{Eq. (16)}$$

And, if desired, an estimate of the true image of side B can be similarly obtained (815) using the same equation but changing only the inputs. That is, Equation (16) with the other inputs becomes:

$$B = f^{-1}[Y - g(X_{flip})] \qquad \text{Eq. (17)}$$

A significant benefit of the approach taken herein is that once a leakage calibration function, g(.), and a leakage mitigation function, $f^{-1}(.)$, have been obtain, which can be obtained as part of a calibration process, the only inputs needed are the images.

Figure 9:
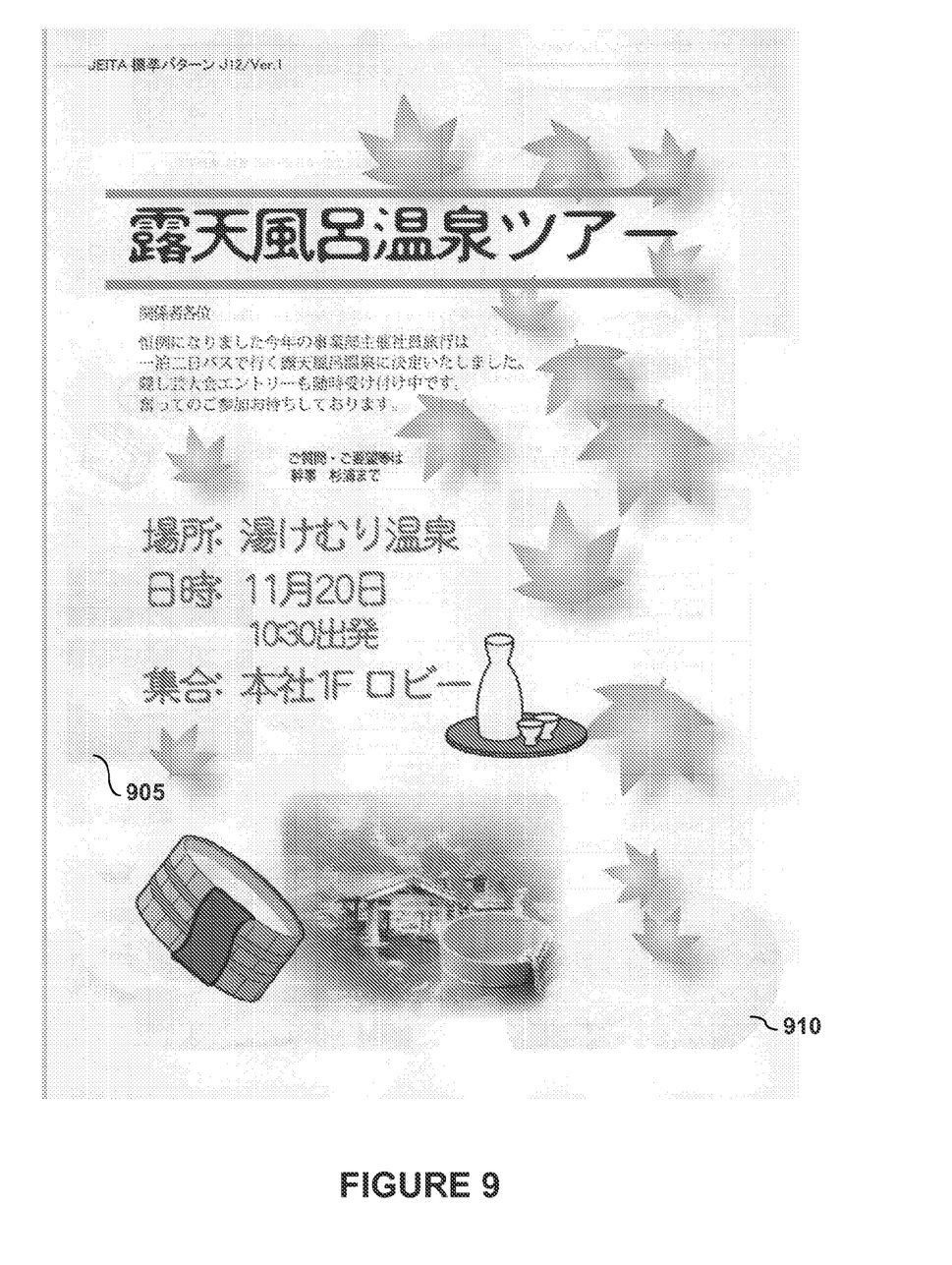
FIG. 9 illustrates an example image of the front side of a double-sided document wherein the example image has leakage from the back-side image according to various embodiments of the invention.
Figure 10:
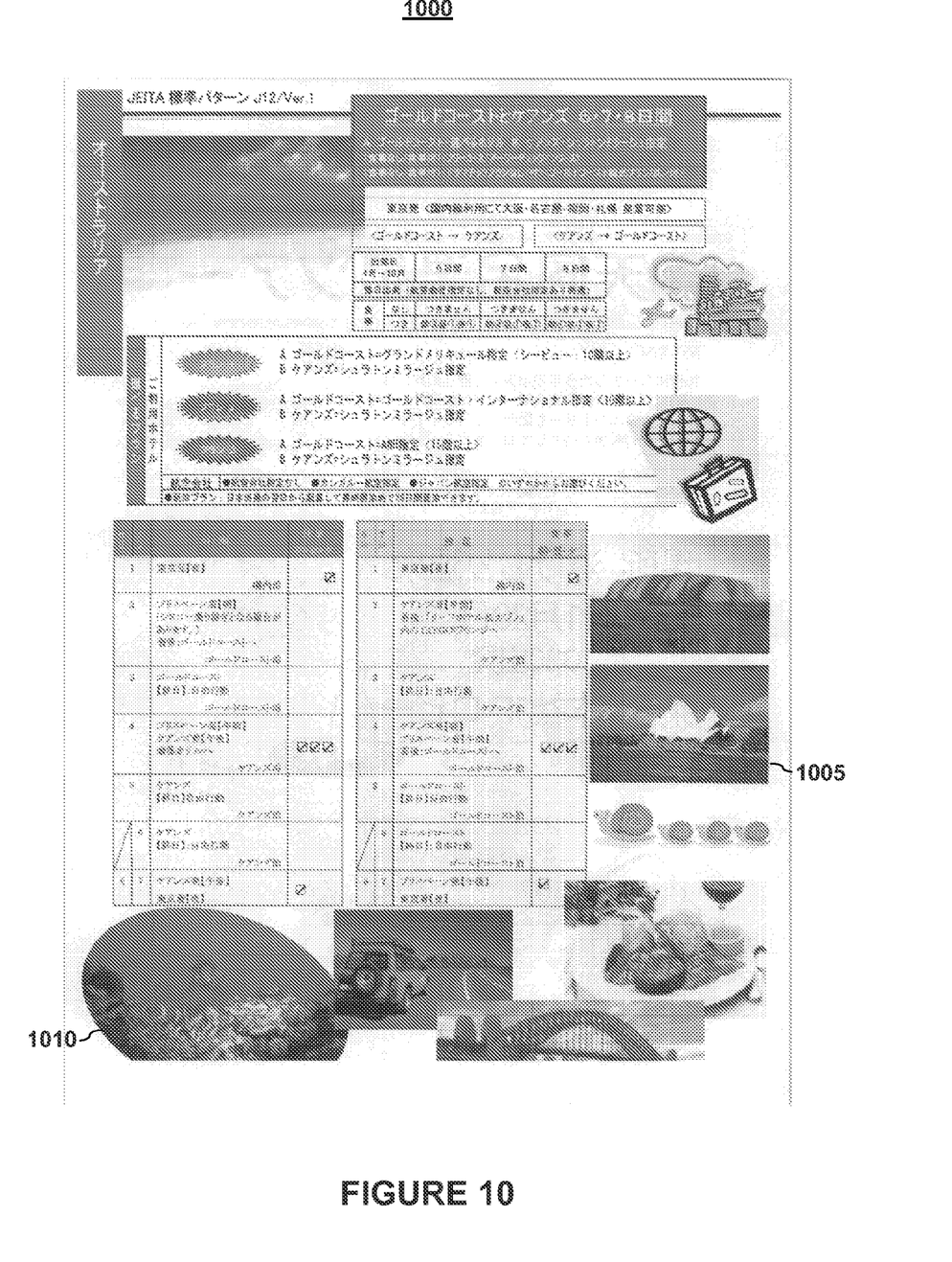
FIG. 10 illustrates an example image of the back side of the double-sided document wherein the example image has leakage from the front-side image according to various embodiments of the invention.

FIGS. 9-12 depicts actual examples of a double-sided document that has been images and the results obtained when the teachings of the present document are applied to the images. FIG. 9 illustrates an example image 900 of the front side of a double-sided document wherein the example image has leakage from the back-side image 1000 according to various embodiments of the invention. The image 900 contains significant leakage throughout the image. For example, consider the regions 905 and 910. These portion of the image 900 correspond to dark patches on the reverse side that show through to this side. FIG. 10 illustrates an example image 1000 of the back side of the double-sided document wherein the example image has leakage from the front side 900 of the document. Note the dark portions 1005 and 1010 that correspond to the leakage portion 905 and 910, respectively in the front-side image 900.

Figure 11:
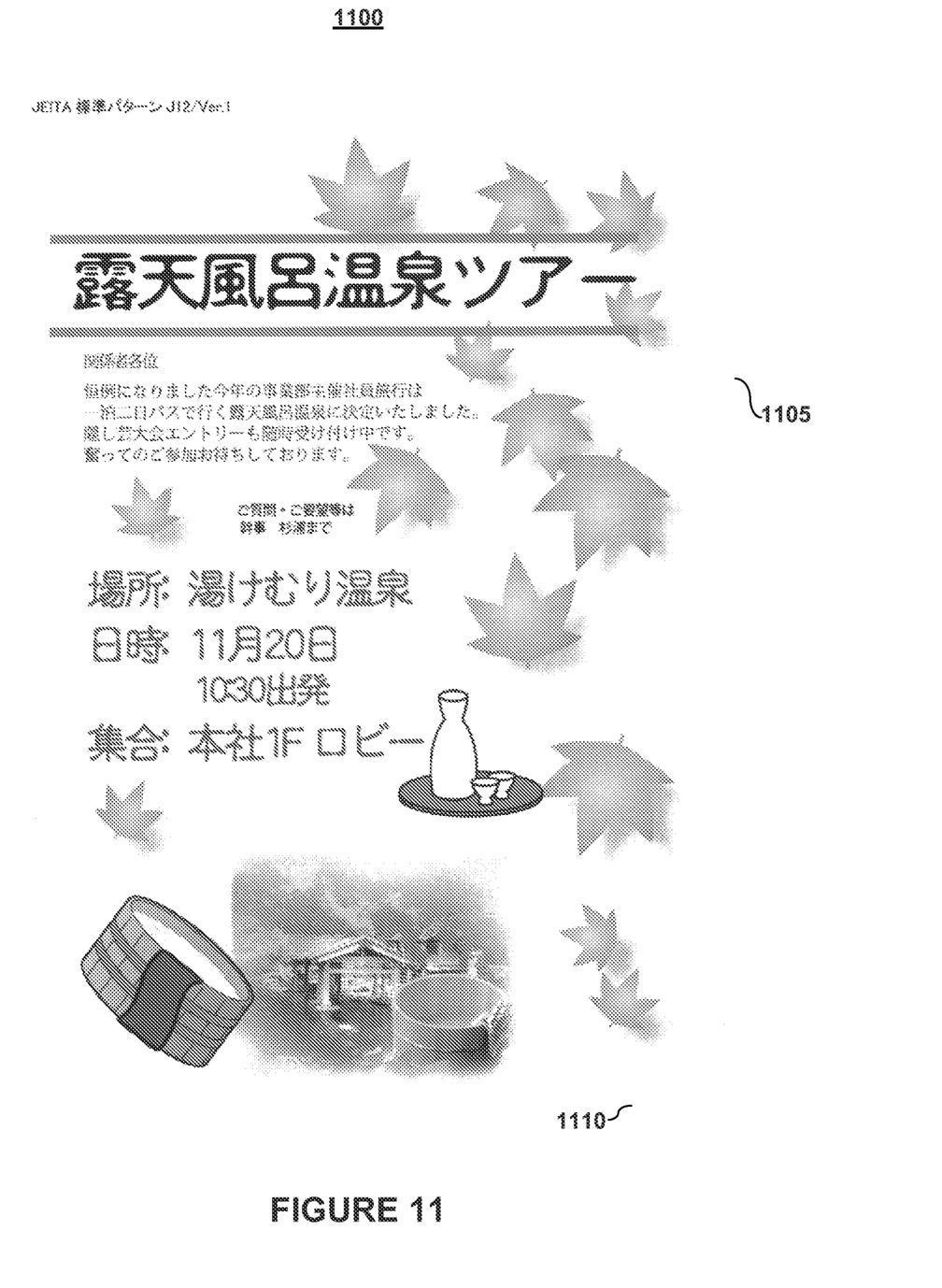
FIG. 11 illustrates the front-side example image of FIG. 9 with some of the leakage from the back-side image removed according to various embodiments of the invention.
Figure 12:
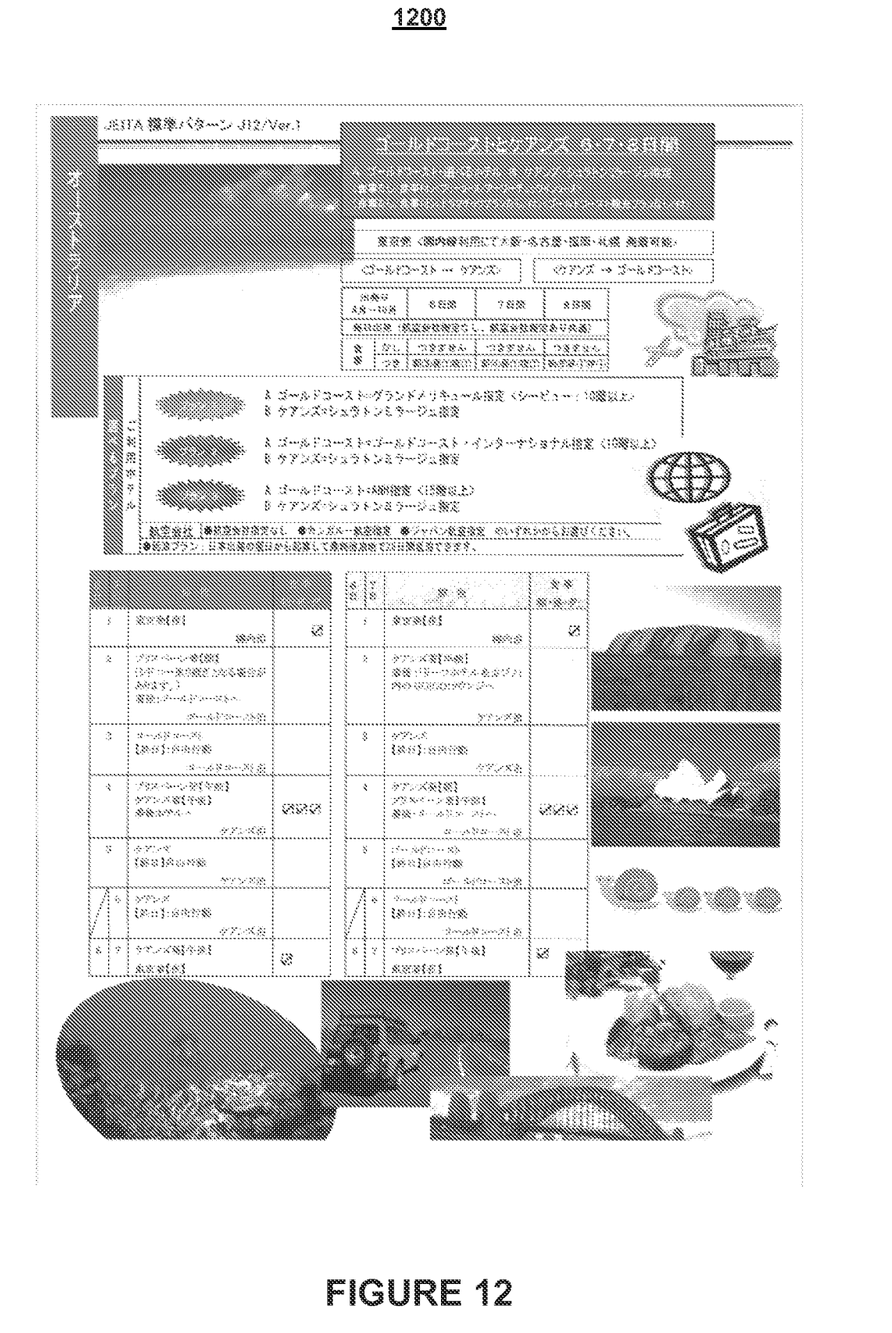
FIG. 12 illustrates the back-side example image of FIG. 10 with some of the leakage from the front-side image removed according to various embodiments of the invention.

Given as inputs these two images 900 and 1000, the leakage function and leakage mitigation function can be applied to the images according to the method depicted in FIG. 8 to obtain estimates of the true images. FIG. 11 illustrates the resulting estimated true image 1100 of the front-side image 900 of FIG. 9 with some of the leakage from the back-side image removed according to various embodiments of the invention. And, FIG. 12 illustrates the resulting estimated true image 1200 of the back-side image 1000 of FIG. 10 with some of the leakage from the front-side image removed according to various embodiments of the invention.

C. System Embodiments

In embodiments, a system that implements leakage mitigation may comprise a leakage mitigation application operating on a computing system that interfaces with or receives data from (directly and/or indirectly) a sensor array that captures the images of the documents and/or from one or more data storage devices. The computing system may comprise one or more computers and may include one or more databases. It shall be noted that the present invention may be implemented in any instruction-execution/computing device/system capable of processing image data. One skilled in the art will recognize that such devices/systems may, include, by way of illustration and not limitation, cameras (video and/or still image), printers, scanners, copiers, computer systems, multi-function devices, and the like. Furthermore, within any of the devices, aspects of the present invention may be implemented in a wide variety of ways including software, hardware, firmware, or combinations thereof. For example, the functions to practice various aspects of the present invention may be performed by components that are implemented in a wide variety of ways including discrete logic components, one or more application specific integrated circuits (ASICs), and/or program-controlled processors. It shall be noted that the manner in which these items are implemented is not critical to the present invention.

Figure 13:
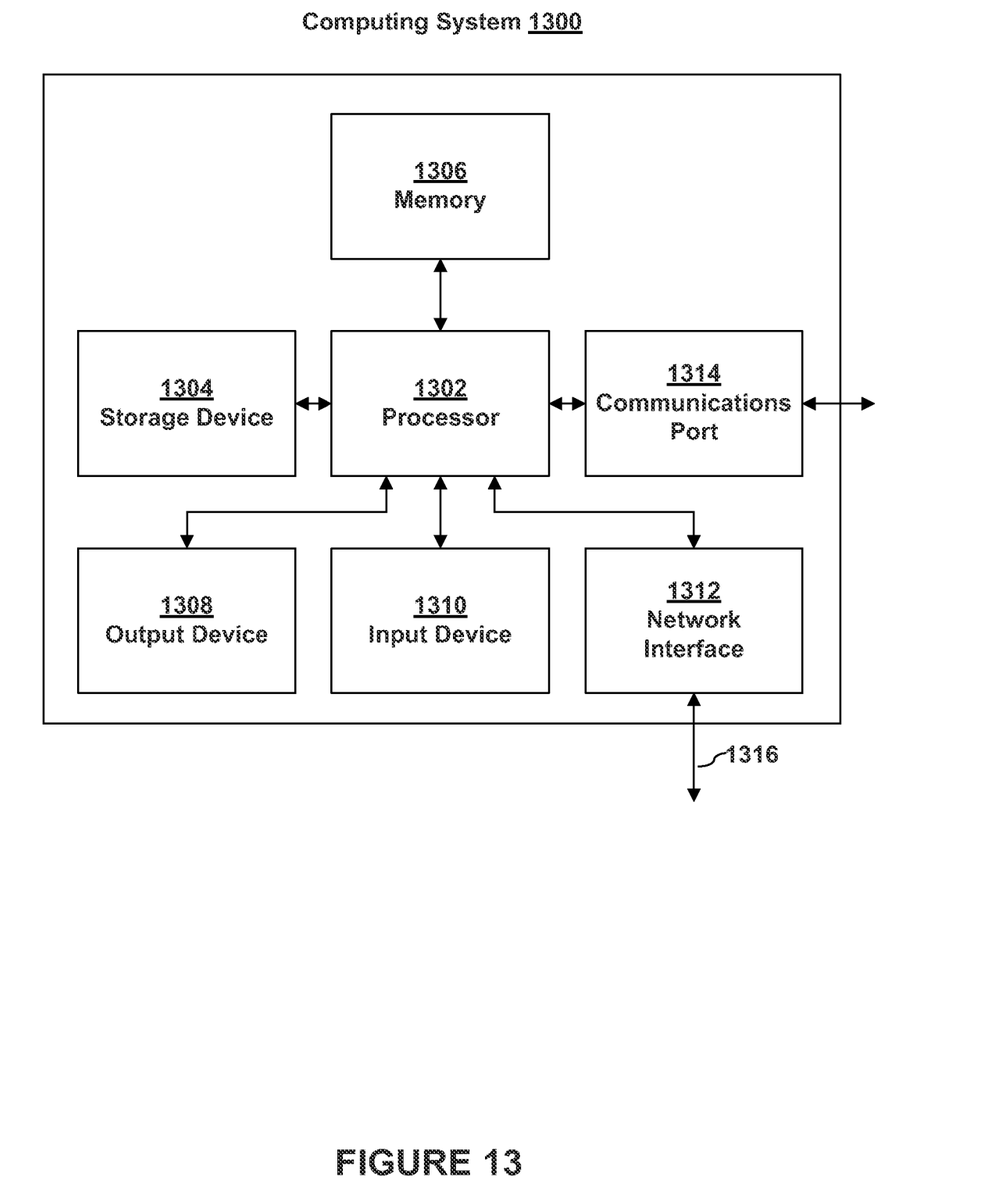
FIG. 13 depicts a computing system according to various embodiments of the invention.

FIG. 13 depicts a functional block diagram of an embodiment of an instruction-execution/computing device 1300 that may implement or embody embodiments of the present invention. As illustrated in FIG. 13, a processor 1302 executes software instructions and interacts with other system components. In an embodiment, processor 1302 may be a general purpose processor such as (by way of example and not limitation) an AMD processor, an INTEL processor, a SUN MICROSYSTEMS processor, or a POWERPC compatible-CPU, or the processor may be an application specific processor or processors. A storage device 1304, coupled to processor 1302, provides long-term storage of data and software programs. Storage device 1304 may be a hard disk drive and/or another device capable of storing data, such as a computer-readable media (e.g., diskettes, tapes, compact disk, DVD, and the like) drive or a solid-state memory device. Storage device 1304 may hold programs, instructions, and/or data for use with processor 1302. In an embodiment, programs or instructions stored on or loaded from storage device 1304 may be loaded into memory 1306 and executed by processor 1302. In an embodiment, storage device 1304 holds programs or instructions for implementing an operating system on processor 1302. In one embodiment, possible operating systems include, but are not limited to, UNIX, AIX, LINUX, Microsoft Windows, and the Apple MAC OS. In embodiments, the operating system executes on, and controls the operation of, the computing system 1300.

An addressable memory 1306, coupled to processor 1302, may be used to store data and software instructions to be executed by processor 1302. Memory 1306 may be, for example, firmware, read only memory (ROM), flash memory, non-volatile random access memory (NVRAM), random access memory (RAM), or any combination thereof. In one embodiment, memory 1306 stores a number of software objects, otherwise known as services, utilities, components, or modules. One skilled in the art will also recognize that storage 1304 and memory 1306 may be the same items and function in both capacities. In an embodiment, one or more of the methods depicted herein may be embodied in one or more modules stored in one or more computer-readable media, such as memory 1304, 1306 and executed by processor 1302.

In an embodiment, computing system 1300 provides the ability to communicate with other devices, other networks, or both. Computing system 1300 may include one or more network interfaces or adapters 1312, 1314 to communicatively couple computing system 1300 to other networks and devices. For example, computing system 1300 may include a network interface 1312, a communications port 1314, or both, each of which are communicatively coupled to processor 1302, and which may be used to couple computing system 1300 to other computer systems, networks, and devices.

In an embodiment, computing system 1300 may include one or more output devices 1308, coupled to processor 1302, to facilitate displaying graphics and text. Output devices 1308 may include, but are not limited to, a display, LCD screen, CRT monitor, printer, touch screen, or other device for displaying information. Computing system 1300 may also include a graphics adapter (not shown) to assist in displaying information or images on output device 1308.

One or more input devices 1310, coupled to processor 1302, may be used to facilitate user input. Input device 1310 may include, but are not limited to, a pointing device, such as a mouse, trackball, or touchpad, and may also include a keyboard or keypad to input data or instructions into computing system 1300.

In an embodiment, computing system 1300 may receive input, whether through communications port 1314, network interface 1312, stored data in memory 1304/1306, or through an input device 1310, from a scanner, copier, facsimile machine, projector, camera, sensors, or other computing device.

One skilled in the art will recognize no computing system is critical to the practice of the present invention. One skilled in the art will also recognize that a number of the elements described above may be physically and/or functionally separated into sub-modules or combined together.

It shall be noted that embodiments of the present invention may further relate to computer products with a computer-readable medium that have computer code thereon for performing various computer-implemented operations. The media and computer code may be those specially designed and constructed for the purposes of the present invention, or they may be of the kind known or available to those having skill in the relevant arts. Examples of computer-readable media include, but are not limited to: magnetic media such as hard disks, floppy disks, and magnetic tape; optical media such as CD-ROMs and holographic devices; magneto-optical media; and hardware devices that are specially configured to store or to store and execute program code, such as application specific integrated circuits (ASICs), programmable logic devices (PLDs), flash memory devices, and ROM and RAM devices. Examples of computer code include machine code, such as produced by a compiler, and files containing higher level code that are executed by a computer using an interpreter. Embodiments of the present invention may be implemented in whole or in part as machine-executable instructions that may be in program modules that are executed by a computer. Examples of program modules include libraries, programs, routines, objects, components, and data structures. In distributed computing environments, program modules may be physically located in settings that are local, remote, or both.

It will be appreciated to those skilled in the art that the preceding examples and embodiment are exemplary and not limiting to the scope of the present invention. It is intended that all permutations, enhancements, equivalents, combinations, and improvements thereto that are apparent to those skilled in the art upon a reading of the specification and a study of the drawings are included within the spirit and scope of the present invention. It is therefore intended that the following claims include such modifications, permutation, and equivalents as fall within the spirit and scope of the present invention.

What is claimed is:

1. A computer program product comprising at least one non-transitory computer-readable medium storing one or more sequences of instructions, wherein execution of the one or more sequences of instructions by one or more processors causes the one or more processors to reduce leakage of a double-sided document by causing the following steps comprising:
   obtaining a first image X captured by a sensor array, the first image X being an image of a first side A of a double-sided document;
   obtaining a second image Y captured by a sensor array, the second image Y being an image of a second side B of the double-sided document;
   using a leakage function to estimate leakage of the second side B onto the first side A, said leakage function being based on an empirical intensity mapping of known pixel intensity values printed on a first side of a document to their correspondingly observed leakage intensity values on the opposite side of the document; and
   applying a leakage mitigation function to the first image X minus the estimated leakage of the second side B onto the first side A to obtain an estimate image of the first side A.

2. The computer program product of claim 1 wherein:
   the intensity mapping is independent of the image of first side A and the image of second side B; and
   the step of using a leakage function to estimate leakage of the second side image B onto the first side A, includes the steps of:
   flipping the second image Y so that it has the layout as in the first image X; and
   applying said leakage function to the flipped second image Y.

3. The computer program product of claim 2 wherein the leakage function is obtained by:
   obtaining a first image C captured by a sensor array, the first image C being an image of a first side of the document, said document having a calibration pattern having a known configuration comprising a plurality of areas of different intensities on a second side of the document;
   generating a set of data from the first image C comprising intensities for each area of at least some of the areas in the first image C that correspond to areas of the plurality of areas of the calibration pattern; and
   estimating the leakage function by fitting a function to the set of data correlated to the corresponding intensities of the plurality of areas of the calibration pattern.

4. The computer program product of claim 1, wherein said leakage function is a non-linear function.

5. The computer program product of claim 1, wherein said leakage function and leakage mitigation function are both cubic functions.

6. The computer program product of claim 1, wherein said leakage mitigation function is the inverse of a function whose definition includes said leakage function operating upon itself.

7. A computer-implemented method for obtaining a leakage mitigation function that can be used to obtain an estimate of a image from a document, the method comprising:
- obtaining a first image captured by a sensor array, the first image being an image of a first side of a document having a calibration pattern having a known configuration comprising a plurality of areas of different intensities on a second side of the document;
- generating a set of data from the first image comprising intensities for each area of at least some of the areas in the first image that correspond to areas of the plurality of areas of the calibration pattern;
- estimating a leakage function by fitting a function to the set of data correlated to the corresponding intensities of the plurality of areas of the calibration pattern; and
- using the leakage function to obtain a leakage mitigation function that takes as inputs a first image of a first side of a double-sided document and a second image of a second side of the double-sided document and outputs a leakage-reduced image of the first side.

8. The method of claim 7 further comprising the step of:
- rectifying the first image so that the intensities for each area of at least some of the areas in the first image can be correlated to areas of the plurality of areas of the calibration pattern.

9. The method of claim 7 wherein the first side of the document is blank.

10. The method of claim 7 wherein the calibration pattern ranges in intensity from 0 to 255.

11. The method of claim 10 wherein the calibration pattern comprises has at least 256 different intensity areas.

12. The method of claim 7 wherein the leakage function is given by:
- $g(x)=b_1+b_2 x+b_3 x^2+b_4 x^3$, where x represents the intensity of an area on the second side of the document and $g(x)$ represents the corresponding intensity on the first side of the document and $b_1$, $b_2$, $b_3$, and $b_4$ are coefficients obtained by fitting to the set of data.

13. The method of claim 12 wherein the step of: using the leakage function to obtain a leakage mitigation function that takes as inputs a first image of a first side of a double-sided document and a second image of a second side of the double-sided document and outputs a leakage-reduced image of the first side comprises the steps of:
- obtaining a function comprising the first side minus values of the leakage function operation upon an output range of the leakage function operating on the first side; and
- obtaining an inverse of the function, wherein the inverse is the leakage mitigation function.

14. The method of claim 13 wherein the leakage mitigation function is given by the inverse of:
- $f(A)=A-g[g(A)]+b_1-\delta$, where $g(\ )$ represents the leakage function, A represents the first side, and $\delta$ represents an error value function.

15. The method of claim 14 wherein $\delta$ is set as a constant.

16. A computer program product comprising at least one non-transitory computer-readable medium storing one or more sequences of instructions, wherein execution of the one or more sequences of instructions by one or more processors causes the one or more processors to cause the method of claim 7 to be performed.

17. A system for mitigating leakage of a document, the system comprising:
- one or more interfaces for receiving a first image X captured by a sensor array, the first image X being an image of a first side A of a double-sided document and for receiving a second image Y captured by a sensor array, the second image Y being an image of a second side B of the double-sided document;
- a data storage for storing the first and second images; and
- one or more processors and at least one computer-readable medium storing one or more sequences of instructions, wherein execution of the one or more sequences of instructions by one or more processors causes the one or more processors to reduce leakage of a double-sided document by causing the following steps:
- using a leakage function to define a leakage image that estimates leakage of the second side B onto the first side A, said leakage function being based on an empirical intensity mapping of known pixel intensity values print on a first side of a document to their correspondingly observed leakage intensity values on the opposite side of the document; and
- applying a leakage mitigation function to the result of the first image X minus the leakage image to obtain an estimate image of the first side A.

18. The system of claim 17 wherein:
- the intensity mapping is independent of the image of first side A and the image of second side B; and
- the step of using said leakage function to define said leakage image includes:
- flipping the second image Y so that it has the layout as in the first image X; and
- applying said leakage function to the flipped second image Y.

19. The system of claim 18 wherein the leakage function is obtained by:
- obtaining a first image C captured by a sensor array, the first image C being an image of a first side of the document, said document having a calibration pattern having a known configuration comprising a plurality of areas of different intensities on a second side of the document;
- generating a set of data from the first image C comprising intensities for each area of at least some of the areas in the first image C that correspond to areas of the plurality of areas of the calibration pattern; and
- estimating the leakage function by fitting a function to the set of data correlated to the corresponding intensities of the plurality of areas of the calibration pattern.

20. The system of claim 19 wherein said leakage mitigation function is the inverse of a function whose definition includes said leakage function operating upon itself.

* * * * *